United States Patent Office 3,814,686
Patented June 4, 1974

3,814,686
TREATMENT OF SEWAGE OR CONTAMINATED WATER
Danvers Allin Swales, Harrogate, England, assignor to Albright & Wilson Limited, Oldbury, near Birmingham, Warwickshire, England
No Drawing. Filed Nov. 17, 1971, Ser. No. 199,742
Claims priority, application Great Britain, Nov. 20, 1970, 55,407/70
Int. Cl. B01d 21/00
U.S. Cl. 210—47          10 Claims

ABSTRACT OF THE DISCLOSURE

A method for removing suspended solids from contaminated water by adding a coagulant composition. The coagulant composition is prepared by digesting chrome residue containing 35–40% by weight of $Fe_2O_3$, 27–32% $Al_2O_3$, 13–18% MgO, and 12–17% $Cr_2O_3$ with a strong mineral acid selected from the group consisting of 20–36% by weight hydrochloric acid and 20–100% by weight sulphuric acid to form a solution of metal salts, said solution containing trivalent iron, aluminum, and chromium ions, and magnesium ions.

---

The present invention relates to the treatment of aqueous systems such as water, industrial effluents, sewage, sludge or other aqueous solutions or suspensions containing contaminents such as inorganic, bacterial or colloidal organic matter capable of coagulation with polyvalent metal ions, all of which aqueous systems will be referred to collectively herein as "contaminated water."

It is known to coagulate bacterial and colloidal organic contaminants in water or sewage by addition of aluminium chlorhydrate. The tripositive aluminium ion is effective in forming a readily filterable, flocculant precipitate with the negatively charged contaminants.

We have now discovered a novel coagulant for use in the treatment of contaminated water. Our coagulant has the advantage that it is readily obtainable from industrial wastes, and is therefore cheap, yet highly efficient.

Our invention provides a coagulant for use in treating contaminated water, consisting of an aqueous solution of metal salts formed by dissolving chrome residue and/or chrome ore in a strong mineral acid.

According to a further embodiment our invention provides a method for the treatment of contaminated water, which comprises adding thereto sufficient of the coagulant of the invention to form a flocculant precipitate and separating the aqueous phase from the coagulated precipitate.

As used herein "chrome residue" refers to the residue left after the extraction of chromium from chrome ore. Typically this involves the oxidation of chromite ore in the presence of alkali (e.g. sodium carbonate) at high temperatures and lixivation with water. The residue consists principally of metal oxides and generally has an approximate composition as folows:

| | Percent by weight |
|---|---|
| $Fe_2O_3$ | 35–40 |
| $Al_2O_3$ | 27–32 |
| MgO | 13–18 |
| $CR_2O_3$ | 12–17 |

The residue is soluble in the common strong mineral acids, such as sulphuric, hydrochloric, nitric and phosphoric acids, to form an aqueous solution of metal salts in the same molar proportions as the corresponding metal oxides in the residue. While any of the aforesaid acids may be employed according to the invention, there are objections to introducing nitrates and phosphates into effluents. Therefore sulphuric and hydrochloric acids are preferred, especially hydrochloric acid.

The invention is applicable to the treatment of any aqueous system containing bacterial or other organic contamination capable of coagulation by polyvalent cations. In general where water treatment, as opposed to sewage treatment, is envisaged we prefer to use sulphates rather than chlorides and vice versa.

Typically, our invention comprises dissolving chrome residue or chromite ore in sufficient strong mineral acid to convert the metal oxides into salts and form an aqueous solution of the salts. The use of chrome residue is preferred.

For example, the residue and the acid may be boiled under reflux and the solution separated from any undissolved solid, e.g. by filtration. In the case of hydrochloric acid, the chrome residue may be added to the acid in excess of the stoichiometric quantity, e.g. from 1 to 10 times stoichiometric and most preferably 2 to 5 times stoichiometric, in the case of sulphuric acid the residue is usually added in a proportion of 0.2 to 5 and preferably 0.5 to 2 times. As used herein "stoichiometric" means a quantity of ore or residue containing acid soluble metal oxides equivalent to the amount of acid. The concentration of the acid may be varied between wide limits, the optimum depending on the particular acid employed, e.g. hydrochloric acid may be used in concentrations up to 36% w./w., preferably 20 to 36% w./w. sulphuric acid is typically used in concentrations of 20 to 100% w./w., preferably 60 to 90% w./w. the term "% w./w." means percent by weight. In some cases, where an excess of acid has been employed, the solution may be neutralized by treatment with a suitable alkali, e.g. an alkaline earth oxide such as calcium oxide, preferably prior to filtration.

The solution of metal salts formed according to the invention may be dried to produce a powdered solid product which is readily soluble in water. Our invention includes such solid products and the solutions formed by redissolving them in water.

A further refinement of the process involves the addition of a reducing agent which will reduce any hexavalent chromium present to trivalent chromium e.g. ferrous sulphate or preferably iron powder, which may be added to the chrome residue/acid reaction mixture. Reaction of the iron with acid results in the formation of a ferrous salt.

A solution, according to our invention, may be added to raw sewage or to secondary or digested sewage sludge in a sufficient proportion to coagulate suspended matter in the sewage to form a flocculent precipitate, which may be readily filtered or dehydrated. The suspended matter, which may be colloidal, may be bacterial organic or inorganic in nature. The level of treatment may be conveniently up to 10%, but preferably 0.5–5.0% $M_2O_3$ equivalent of trivalent metal salts based on the dry solids content of the sewage or sewage sludge.

The treated sewage may be stored in settling tanks, storm tanks or ponds and the coagulated matter allowed to settle and the aqueous phase drawn off. Preferably, however the treated sewage may be filtered by means of mechanical filters such as rotary vacuum filters or filter presses. Alternatively it may be stored in drying beds and the water removed by drainage and evaporation.

Potable water supplies and aqueous industrial wastes may also be purified by the addition of a sufficient quantity of a treatment agent, according to our invention, to coagulate inorganic and organic contaminants in the water to form a floc. Up to 100 p.p.m., but preferably 10–50 p.p.m., $M_2O_3$ equivalent of trivalent metal salts may be added in the form of a powder, or preferably in the form of a solution.

The treated water may be allowed to settle in, for example a vertical-flow sedimentation tank prior to rapid sand filtration, or may be filtered through pressure filters.

The invention is illustrated by the following examples in which the term "% w./v." means percentage by weight of the noted solution component based on the total volume of the solution.

EXAMPLE 1

Chrome residue was added to 20% hydrochloric acid in a 300% stoichiometric excess. The mixture was boiled for two hours under reflux. The resulting solution of chlorides had the following composition:

Chloride solution:
  Total $M_2O_3$=16.5% w./v.
  $Al_2O_3$=6.7% w./v.
  $Fe_2O_3$=7.8% w./v.
  $Cr_2O_3$=1.9% w./v.
  $MgO$=0.5% w./v.
  $Cr^{6+}$=Nil
  Excess acid=3.0% w./v. HCL The solution was added to sewage in a proportion of 3% equivalent metaloxide based on the dry weight of sludge. The sewage was then filtered. The cost effectiveness of the solution of the example was substantially superior to that of aluminium chlorhydrate.

EXAMPLE 2

Sulphate solution:
  Total $M_2O_3$=16.1% w./v.
  $Al_2O_3$=5.6% w./v.
  $Fe_2O_3$=7.4% w./v.
  $FeO$=1.4% w./v.
  $Cr_2O_3$=1.5% w./v.
  $MgO$=0.6% w./v.
  $Cr^{6+}$=Nil
  Excess Acid=7.4% w./v. ($H_2SO_4$)

EXAMPLE 3

To 145 parts by weight of dry chrome residue (containing 83% by weight of trivalent metal oxides) was added 270 parts by weight of 28% w./w. hydrochloric acid. This represented an amount of acid equivalent to 33% of the stoichiometric quantity required to dissolve all the metal oxides present. The mixture was boiled for two hours under reflux then filtered to remove undissolved material. The resulting solution had the following composition with regard to its main constituents:

Total $M_2O_3$=15.2% w./v. (M=trivalent metal ion)
$Fe_2O_3$=7.5% w./v.
$Al_2O_3$=6.9% w./v.
$Cr_2O_3$=0.8% w./v.
$MgO$=1.1% w./v.
$Cr^{6+}$=Nil
Excess acid =1.6% w./v. HCl

EXAMPLE 4

To 100 parts by weight of dry chrome residue (containing 83% by weight of trivalent metal oxides) was added 260 parts by weight of 80% w./w. sulphuric acid and 4 parts by weight of iron powder. The mixture was boiled under reflux for two hours and then treated with a slurry containing 40 parts by weight of calcium oxide in 400 parts by weight of water. The mixture was boiled under reflux for a further hour then filtered to remove undissolved solids. The resulting solution had the following composition with regard to its main constituents.

Total $M_2O_3$=11.7% w./v. (M=trivalent metal ion)
$F_2O_3$=5.1% w./v.
$Al_2O_3$=3.6% w./v.
$FeO$=0.9% w./v.
$Cr_2O_3$=2.0% w./v.
$MgO$=1.7% w./v.
$Cr^{6+}$=Nil
Excess acid=0.2% w./v. $H_2SO_4$

EXAMPLE 5

A sewage sludge which contained a proportion of industrial effluent, was a mixture of raw and humus sludge and had a solids content of 4.1%. The conditioner was prepared by dilution of 62 parts of a solution prepared as in Example 3, to 1000 parts with water. Filtrability was measured on a Triton W.P.R.L. Type 92/1 CST apparatus (described in Journal of the Institute of Water Pollution Control No. 2 1968 and subject of B.P. application 22681/66).

100 ml. of the sludge was admixed with 10 ml. of the conditioner solution, representing 2.3% $M_2O_3$ on solids, and compared with 100 mls. of sludge added to 10 ml. water as a control. The CST had dropped from 239 seconds to 11 seconds thus demonstrating the improvement in filtrability.

EXAMPLE 6

100 ml. of a sludge from a mainly domestic sanitary sewage containing 5.0% solids was added to 10 ml. of a solution prepared as in Example 4 and the CST measured. The results obtained are given in Table 1.

TABLE 1

| Percent $M_2O_3$ on sludge solids: | C.S.T. (secs.) |
|---|---|
| Nil | 116 |
| 0.3 | 50 |
| 0.8 | 22.5 |
| 1.3 | 14.2 |
| 1.8 | 13.6 |

EXAMPLE 7

Sludge containing 6.8% solids was tested as described in Examples 5 and 6 using both chloride and sulphate solutions of powders produced by drying solutions as described in Examples 3 and 4. Table 2 gives the results of these tests.

TABLE 2

| Treatment | Percent $M_2O_3$ on sludge solids | C.S.T. (secs.) |
|---|---|---|
| Nil | Nil | 426 |
| Sulphate solution | 1.75 | 58 |
| Chloride solution | 1.70 | 29 |

EXAMPLE 8

A sample of water containing 205 p.p.m. of solids and having a pH of 8.1 was obtained from an upland holding reservoir. One liter samples were mixed with varying quantities of materials manufactured substantially according to Examples 3 and 4. The chloride solution contained 14.2% $M_2O_3$ and the sulphate solution 8.9% $M_2O_3$.

The amount of coagulants required to produce complete clarity are given in Table 3.

TABLE 3

| Treating agent: | P.p.m. $M_2O_3$ required to give complete clarity |
|---|---|
| Sulphate solution | 25.1 |
| Chloride solution | 22.5 |

As a further test of the purifying properties, the reduction in color was also measured using a Uvispek spectrophotometer set at 400 nm. The results given in Table 4 illustrate how the addition of the conditioning agent reduced the color of the water.

TABLE 4

| Treating agent | Level of treatment (p.p.m. $M_2O_3$) | Optical density |
| --- | --- | --- |
| Nil | Nil | 0.137 |
| Sulphate solution | 16.1 | 0.079 |
| Do | 26.9 | 0.010 |
| Chloride solution | 12.5 | 0.032 |
| Do | 25.0 | 0.015 |

Typically the coagulent compositions of our invention contain trivalent iron salts as the principal ingredient, usually in a proportion of between 35 and 50%, with aluminium salts as the second most plentiful ingredient, in a proportion of 20 to 45%. Trivalent chromium salts and magnesium salts are usually present in a proportion of at least 2% each and divalent iron is optionally present. Hexavalent chromium is substantially absent. All the foregoing percentages are expressed as weight of equivalent metal oxide based on total equivalent metal oxide. Our invention includes coagulent compositions having the above specified typical proportions of ingredients.

We claim:

1. A method for the treatment of contaminated water containing suspended solids which comprises adding thereto an effective amount of a coagulant composition prepared by digesting chrome residue containing 35–40% by weight of $Fe_2O_3$, 27–32% $Al_2O_3$, 13–18% MgO, and 12–17% $Cr_2O_3$ with a strong mineral acid selected from the group consisting of 20–36% by weight hydrochloric acid and 20–100% by weight sulphuric acid to form a solution of metal salts, said solution containing trivalent iron, aluminum, and chromium ions, and magnesium ions in relative molar concentrations corresponding to their relative concentration in said chrome residue, whereby said suspended solids are removed from said water.

2. The method of claim 1 wherein said solution containing said trivalent iron, aluminum, and chromium ions, and magnesium ions is dried to form a powdered coagulant composition; and wherein said powdered coagulant composition is added to said contaminated water.

3. The method of claim 1 wherein said chrome residue is digested with hydrochloric acid in a proportion of from 1 to 10 times the stoichiometric amount.

4. The method of claim 1 wherein said chrome residue is digested with sulphuric acid in a proportion of 0.2 to 5 times the stoichiometric amount.

5. The method of claim 1 wherein said contaminated water containing suspended solids is sewerage sludge and wherein said coagulant composition is added in a proportion of from 0.1 to 10% expressed equivalent trivalent metal oxide based on the weight of solids in the sludge and subsequently dewatering said sludge.

6. The method of claim 1 wherein said coagulant composition consists essentially of water soluble metal salts selected from chlorides and sulphates and containing as the principal ingredient trivalent iron salts in a proportion of between 30 and 50%, and as the second most plentiful ingredient aluminum salts in a proportion of between 20 and 45%, together with salts of chromium and magnesium in a proportion of at least 2% each and from 0 to 20% of divalent iron salts but substantially free from salts of hexavalent chromium, said percentages being expressed as weight equivalent metal oxide based on the total equivalent metal oxide.

7. The method of claim 6 wherein said contaminated water containing suspended solids is a contaminated water supply and wherein said coagulant composition is added in a concentration of from 1 to 100 parts per million expressed as trivalent metal oxide thereby coagulating said suspended solids.

8. The method of claim 1 wherein a reducing agent for hexavalent chromium in an amount sufficient to reduce any hexavalent chromium present to trivalent chromium is added to said solution.

9. A method according to claim 6 wherein said reducing agent is selected from ferrous sulphate or ferrous chloride.

10. A method according to claim 9 wherein said reducing agent is formed in situ by addition of powdered iron during the digestion of said chrome residue.

References Cited

UNITED STATES PATENTS

| 3,575,853 | 4/1971 | Gaughan et al. | 210—50 X |
| 1,197,123 | 9/1916 | Hoover | 210—47 |
| 2,338,958 | 1/1944 | Muskat | 210—10 X |

OTHER REFERENCES

Chem. Abstracts, 1952, 46, 10085d (P.O.S.L.).
Chem. Abstracts, 1959, 53, 14465b (P.O.S.L.).

CHARLES N. HART, Primary Examiner

P. A. HRUSKOCI, Assistant Examiner